No. 838,990. PATENTED DEC. 18, 1906.
U. B. HEBERT & H. J. BROWN.
RAKE CLEARER.
APPLICATION FILED MAR. 21, 1906.
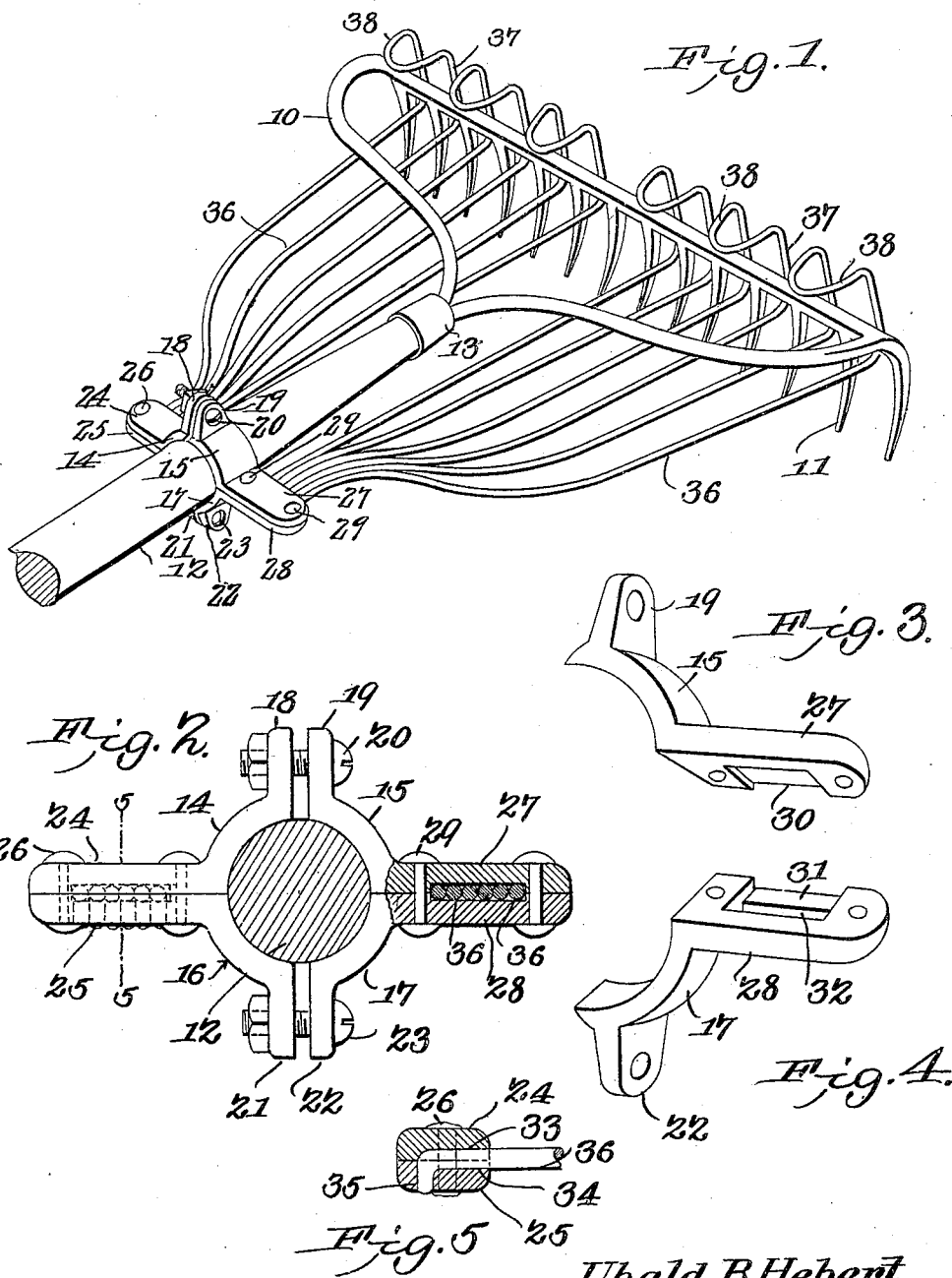
WITNESSES:
E. F. Stewart
C. N. Woodward
Ubald B. Hebert and
Harry J. Brown
INVENTORS
By C. A. Snow & Co.
ATTORNEYS

UNITED STATES PATENT OFFICE.

UBALD B. HEBERT AND HARRY J. BROWN, OF WALLINGFORD, VERMONT.

RAKE-CLEARER.

No. 838,990.  Specification of Letters Patent.  Patented Dec. 18, 1906.

Application filed March 21, 1906. Serial No. 307,230.

*To all whom it may concern:*

Be it known that we, UBALD B. HEBERT and HARRY J. BROWN, citizens of the United States, residing at Wallingford, in the county of Rutland and State of Vermont, have invented a new and useful Rake-Clearer, of which the following is a specification.

This invention relates to attachments to garden-rakes for the purpose of clearing the same of leaves, grass, and other adhering material while the rake is being used, and has for its object to produce a simply-constructed device which may be easily applied to any of the various forms of rakes manufactured without constructural changes in the same.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

The improved device comprises a plurality of resilient fingers or bars connected by a suitable clamping means to the handle of the rake rearwardly of its head and extending between the teeth of the rake, with the terminals so arranged that by reversing the rake and applying pressure to the head portion any material adhering to the teeth will be easily disengaged therefrom.

For the purpose of illustration the device is shown applied to a conventional rake-head and its handle, Figure 1 representing a rake-head and a portion of its handle with the improved clearing device attached thereto. Fig. 2 is a rear elevation, enlarged, of the clamping portion of the device, with the handle and a portion of the clamping device in section. Figs. 3 and 4 are perspective views of two elements of the clamping device. Fig. 5 is a sectional detail on the line 5 5 of Fig. 2.

The rake-head portion is represented as a whole at 10, with the teeth 11 and with the handle 12 connected to the head portion at 13. Bearing over the handle portion rearwardly of the ferrule 13 is a clamping device of four pieces 14, 15, 16, and 17, the parts 14 15 having ears 18 19, connected by a clamp-bolt 20, and the parts 16 17 having ears 21 22, coupled by a clamp-bolt 23. The parts 14 16 are provided, respectively, with lateral arms 24 25, riveted together at 26, and the parts 15 17 are likewise formed with lateral arms 27 28, connected by rivets 29. The clamping device is thus adapted to be connected detachably around the handle 12 and adjustable thereon longitudinally.

The arms 24 25 are provided with recesses in their adjacent faces opening toward the head portion of the rake, and the recess in the arm 25 is provided with an aperture extending through the arm and communicating with the recesses, the aperture and the recesses thus being disposed at right angles to each other. The arms 27 28 are also provided with similar recesses and the arm 28 with an aperture communicating with the recesses and opening through the arm, the recesses and apertures in the arms being precisely alike.

In Figs. 3, 4, and 5 the arrangement of these recesses and apertures is clearly shown. For instance, in Fig. 3, which represents the part 15 and its ear 19 and arm 27, the recess in the arm is represented at 30, while in Fig. 4, which represents the part 17 and its ear 22 and arm 28, the recess is represented at 31 and the communicating aperture at 32. In Fig. 5, which represents a transverse section of the arms 24 and 25 of the parts 14 and 16 the recess in the arm 24 is represented at 33 and the extending recess in the arm 25 is represented at 34 and the communicating aperture at 35. The recesses and the communicating aperture are designed to support resilient clearer bars or fingers 36, the finger-bars being formed first in elongated-U shape, with the terminals entering the recesses in the arms of the clamping member and the ends turned laterally and fitting into the apertures 32 and 34, as represented in Figs. 2 and 5. The fingers 36 are thus brought close together and firmly clamped at their rear ends and diverge toward the teeth 11 and pass between the teeth and are bent laterally at 37 and curved rearwardly at 38 over the head portion 10. The resiliency of the fingers 36 will maintain them yieldably against the head portion 10 at the "roots" of the teeth 11, and the rearwardly-bent ends 38 are thus spaced a considerable distance from the head portion of the rake when the resilient fingers are in normal position, or as shown in Fig. 1. The fingers when in this position do not interfere with the action of the rake; but when the teeth 11 become clogged with leaves, grass, or the like they can be very quickly cleared by reversing the position of the rake to bring the bent portion 38 upon the ground and forcing the rake-head downward by pressure exerted upon the handle, which movement will cause the head portion of the rake to quickly strip the teeth of the obstructing material.

The device is simple in construction and can be inexpensively manufactured and readily applied to all sizes and forms of rakes and similar implements.

Having thus described the invention, what is claimed as new is—

1. In a device of the class described, a clamp having lateral arms and with means for connecting the same to the handle of a rake, and a plurality of U-shaped resilient bars connected at their spaced ends to said arms and extending at the looped ends between the teeth of the rake.

2. In a device of the class described, a clamp adapted to be attached to the handle of a rake, and a plurality of U-shaped bars of resilient material connected at their spaced ends to said clamp and extending at their bends between the rake-teeth.

3. In a device of the class described, a clamp adapted to be attached to the handle of a rake, and a plurality of U-shaped bars of resilient material connected at their spaced ends to said clamp and extending at their bends between the rake-teeth and extending in advance of the head of the rake and thence rearwardly and spaced from the same.

4. In a device of the class described, a clamp formed of a plurality of parts and adapted to be coupled upon the handle portion of a rake and provided with recesses in the contiguous faces of the parts and lateral apertures communicating with said recesses, and a plurality of bars of resilient material bearing in said recesses and bent at one end for engaging said apertures and with the free ends for extending between the teeth of the rake.

5. In a device of the class described, a clamp formed of a plurality of parts and adapted to be coupled to the handle portion of the rake and provided with recesses in the contiguous faces of the parts and lateral apertures communicating with said recesses, and a plurality of U-shaped bars of resilient material bearing at their spaced ends in said recesses and extending through said apertures and with looped portions of the bars extending between the teeth of the rake and bent beyond the head of the same.

In testimony that we claim the foregoing as our own we have hereto affixed our signatures in the presence of two witnesses.

UBALD B. HEBERT.
HARRY J. BROWN.

Witnesses:
CLAYTON E. BROWN,
HARRY B. TOWNSEND.